July 12, 1960 W. C. KINSEY 2,944,694
TV-PARTY SNACK SERVER

Filed July 28, 1958 2 Sheets-Sheet 1

INVENTOR.
WALTER KINSEY

July 12, 1960

W. C. KINSEY 2,944,694

TV-PARTY SNACK SERVER

Filed July 28, 1958

INVENTOR.
WALTER KINSEY

United States Patent Office 2,944,694
Patented July 12, 1960

2,944,694

TV-PARTY SNACK SERVER

Walter C. Kinsey, 2121 Cortez Lane,
Sacramento 21, Calif.

Filed July 28, 1958, Ser. No. 751,401

1 Claim. (Cl. 220—17)

This invention relates to serving apparatus and more particularly to a snack server.

It is an object of the present invention to provide a convenient device for serving snacks during parties and for people watching television and the like.

Another object of the present invention is to provide a television and party snack server which will enable various types of refreshments to be served in a simple and efficient manner and with a minimum amount of waste and inconvenience.

Still a further object of the present invention is to provide a snack server of the above type which will enable various stable refreshments to be conveniently stored between periods of use in a clean and safe manner, and which will allow such edibles to be available for use at all times.

Other objects of the invention are to provide a TV party snack server bearing the above objects in mind which is of simple construction, has a minimum number of parts, is inexpensive to manufacture and efficient in operation.

For other objects and for a better understanding of the invention, reference may be had to the following detailed description taken in conjunction with the accompanying drawing, in which.

Figure 1:
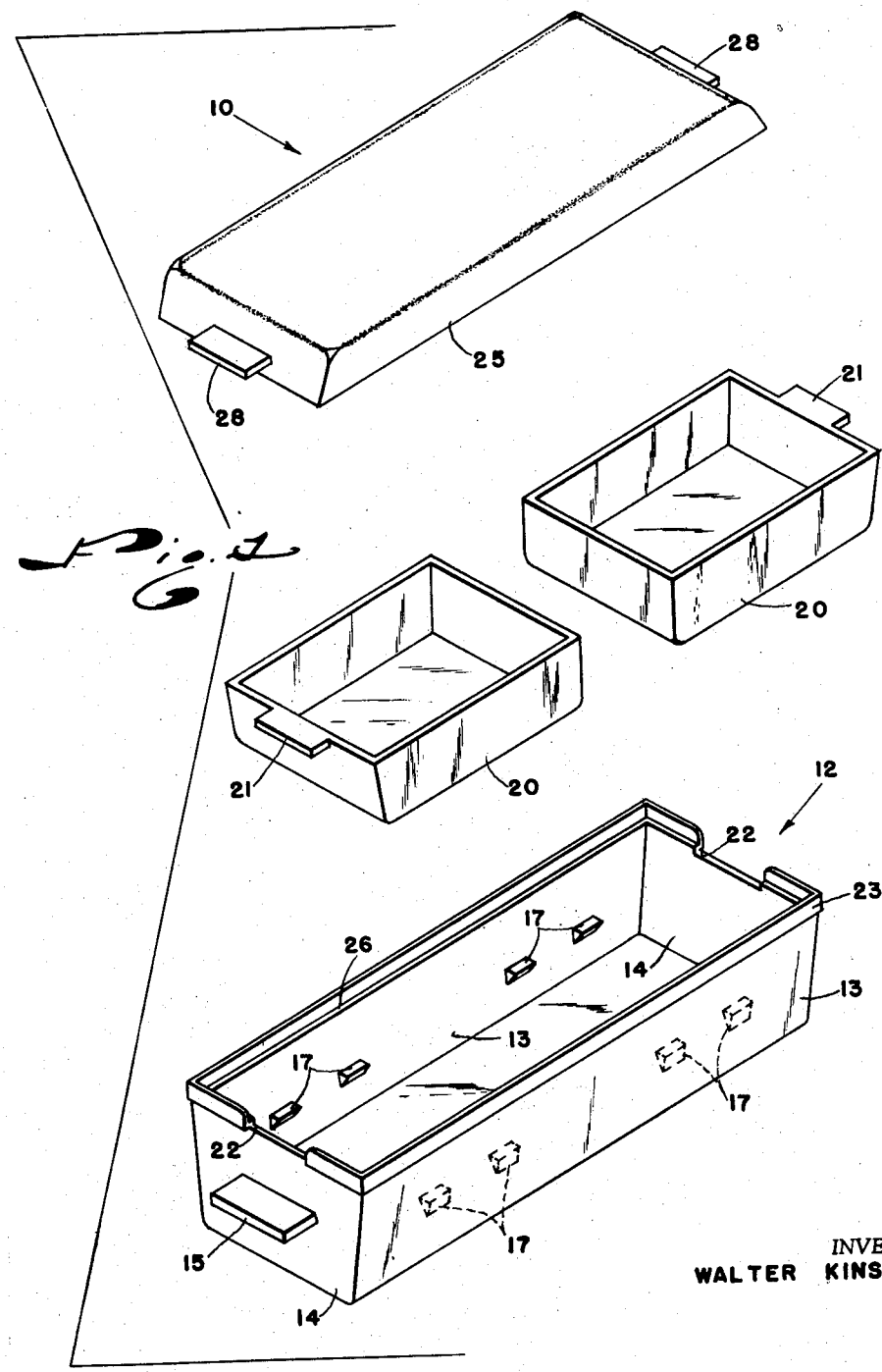
Figure 1 is an exploded perspective view of a TV party snack server made in accordance with the present invention.

Referring now more in detail to the drawing, a serving tray 10 made in accordance with the present invention is shown to include a main base 12 having spaced side walls 13 and end walls 14 defining an interior compartment. Each of the end walls 14 is provided with a handle 15, while each side wall 13 is provided with a plurality of longitudinally spaced apart and inwardly extending lugs 17. All of the lugs 17 define an upper supporting surface lying in a substantially common plane for engaging and supporting a pair of smaller trays 20 that may be removably inserted into the base 12.

As is more clearly shown in Figure 1 of the drawing, each of the smaller trays 20 having spaced side walls of the same angle of inclination as that of said side walls of said main base and includes one handle 21 that extends outwardly through cut outs 22 in the end walls 14 and in the adjacent portions of an upwardly extending annular rim 23 integral with the base 12. This rim 23 defines an upwardly facing shoulder 26 with the side and end walls of the base 12 for supporting the peripheral portions of a removable lid 25. It will be noted that the lid 25 is also provided with handles 28 that are in substantially vertical alignment with the handles 21 of the smaller trays 20 and the handles 15 of the base 12.

The unit may be conveniently used for serving up to three different types of refreshments at the same time.

Figure 2:
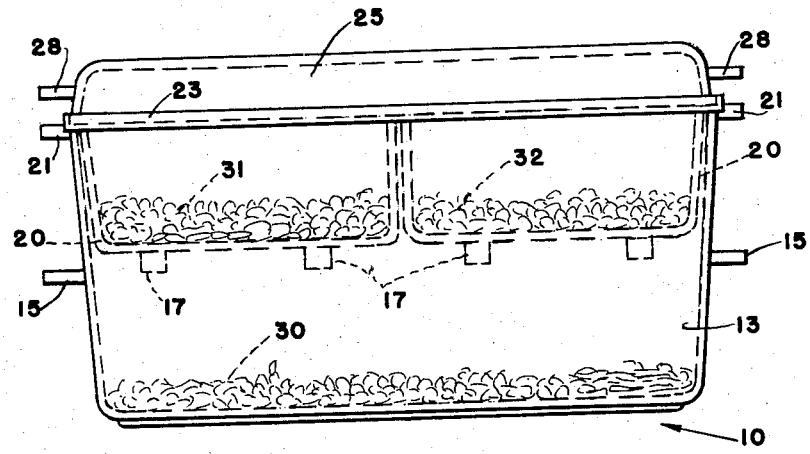
Figure 2 is a side elevational view of the assembled server shown in Figure 1.
Figure 3:
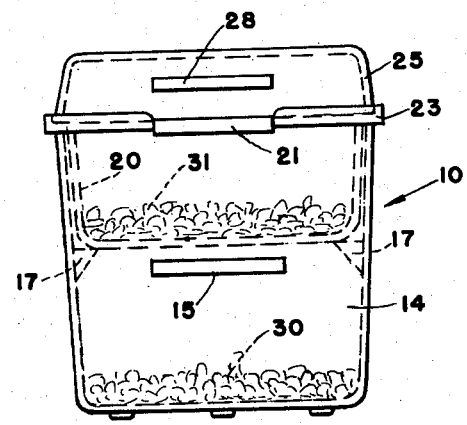
Figure 3 is an end elevational view of the device shown in Figure 2.

For example, as is shown in Figures 2 and 3, the base 12 may be used for popcorn 30 or other bulky material, while each of the smaller trays 20 may be used for nuts 31, candy 32, or other types of edibles. In use, the lid 25 is removed and inverted, thus forming a shallow dish into which various waste materials may be deposited until the party has terminated. It is then only necessary to empty and clean the lid 25, return the smaller trays 20 to within the base 12, and place the lid 25 in sealing engagement upon the top of the base 12, thus protecting the contents against contamination and waste. The unit may then be conveniently stored for the next use, at which time all of the contents will be completely fresh and intact. This arrangement completely obviates the necessity of having to clean a large number of dishes and trays after each use and further minimizes waste and the dropping of small particles of food upon the floor and rugs. Of course, this unit can also be conveniently used on picnics, automobile trips, and the like, as a simple, compact, and efficient unit. It being obvious that said cover seals the two trays and said two trays seal the interior chamber of said main base.

While various changes may be made in the detail construction, it shall be understood that such changes shall be within the spirit and scope of the present invention as defined by the appended claim.

What I claim as new and desire to protect by Letters Patent of the United States:

A triple compartment food serving tray and cover of rectangular configuration comprising, in combination, a main base of rectangular configuration with a bottom wall and upwardly and outwardly extending side and end walls defining an enlarged central compartment, an annular vertical rim extending outwardly and upwardly from the top of said side and end walls of said main base forming an internal shoulder therewith, each of said side walls of said main base provided with a plurality of integral longitudinally spaced apart inwardly extending lugs with flat horizontal upper supporting surfaces in a common horizontal plane, each of said end walls provided on the exterior thereof with integral rectangular shaped handles extending horizontally and outwardly therefrom, a pair of rectangular shaped trays with bottom walls of the same size and of a combined longitudinal length substantially equal to the longitudinal length of said central compartment midway between the bottom and the upper periphery thereof, each of said trays having one vertical end wall, along with two side walls and a second end wall which extend upwardly and outwardly therefrom defining closed wall trays, said inclined side and end walls of said trays having the same angle of inclination as that of said inclined side and end walls of said main base, the exterior width of said trays at the tops thereof being substantially the same as the internal width of said central compartment at the top of the side walls of said main base and adjacent said internal shoulder thereof, each of said trays having a single horizontal outwardly extending integral rectangular shaped handle on the exterior of the inclined end wall thereof, said rim formed with each of said end walls of said main base having defined cut-outs for accommodating the integral handles of each of said trays, whereby when the trays are arranged with their vertical end walls together, end to end, the handles are arranged at the opposite ends thereof so as to extend beyond the end walls of said main base when the trays are arranged within said central compartment, the bottom wall of each of said trays supported upon said lugs extending outwardly from the side walls of said main base, the exterior of said side walls of said trays and the one inclined end wall of each tray being in surface contact with the interior surface of the sides and end walls of said main base, a rectangular cover with downwardly and outwardly inclined depending side and end walls, each of said end walls of said cover provided on the exterior thereof with an integral horizontal, outwardly extending rectangular shaped handle, said handles formed on said main base, said trays and said cover at either end thereof being in vertical alignment with respect to each other and on the exterior of the combined serving tray, and said shoulder of said main base supporting receiving the lower periphery of said cover when placed inside said vertical rim, whereby said cover seals the pair of trays within said central compartment and said trays seal the upper portion of said central compartment.

References Cited in the file of this patent

UNITED STATES PATENTS

| | | |
|---|---|---|
| 1,768,976 | Cuthbertson | July 1, 1930 |
| 1,811,439 | Scherz et al. | June 23, 1931 |
| 2,507,425 | Swartout | May 6, 1950 |
| 2,556,631 | Pool | June 12, 1951 |
| 2,591,578 | McNealy et al. | Apr. 1, 1952 |
| 2,645,332 | Martin et al. | July 14, 1953 |
| 2,897,996 | Billig et al. | Aug. 4, 1959 |